United States Patent
Ahearn et al.

(10) Patent No.: US 10,264,433 B2
(45) Date of Patent: Apr. 16, 2019

(54) SYSTEM AND METHOD FOR USING AN ELECTRONIC LOCK WITH A SMARTPHONE

(71) Applicant: Schlage Lock Company LLC, Carmel, IN (US)

(72) Inventors: John R. Ahearn, Pasadena, CA (US); Joseph W. Baumgarte, Carmel, IN (US); Gabriel D. Focke, Sunman, IN (US); Michael S. Henney, Indianapolis, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

(21) Appl. No.: 15/471,759

(22) Filed: Mar. 28, 2017

(65) Prior Publication Data

US 2017/0265026 A1 Sep. 14, 2017

Related U.S. Application Data

(63) Continuation of application No. 13/968,678, filed on Aug. 16, 2013, now abandoned.

(Continued)

(51) Int. Cl.
*G07C 9/00* (2006.01)
*H04W 4/80* (2018.01)
(Continued)

(52) U.S. Cl.
CPC .......... *H04W 4/80* (2018.02); *G07C 9/00174* (2013.01); *G07C 9/00571* (2013.01);
(Continued)

(58) Field of Classification Search
CPC .... H04W 4/80; H04W 12/06; G07C 9/00174; G07C 9/00571
See application file for complete search history.

(56) References Cited

U.S. PATENT DOCUMENTS 6,084,511 A * 7/2000 Kil ....................... G08B 13/149
340/545.6
8,922,333 B1 12/2014 Kirkjan
(Continued)

FOREIGN PATENT DOCUMENTS

EP 2710562 A1 3/2014
WO 2012151290 A1 11/2012

OTHER PUBLICATIONS

International Search Report for PCT/US2013/055456 dated Nov. 8, 2013, 2 pages.
(Continued)

*Primary Examiner* — David Orange
(74) *Attorney, Agent, or Firm* — Taft Stettinius & Hollister LLP

(57) ABSTRACT

An electronic lock may transmit advertising that the electronic lock is available for communication. A smartphone may establish communication with the electronic lock in response to the advertising. The electronic lock may transmit an encrypted lock identification to the smartphone. The smartphone may transmit the lock identification and a smartphone identification to a cloud. In response, the cloud transmits to the smartphone an encrypted update such as the user database, time and date, and lock configuration. The smartphone may transmit the encrypted update to the electronic lock.

14 Claims, 3 Drawing Sheets

Related U.S. Application Data

(60) Provisional application No. 61/684,070, filed on Aug. 16, 2012.

(51) Int. Cl.
    *H04W 12/06* (2009.01)
    *H04W 84/18* (2009.01)

(52) U.S. Cl.
    CPC .. *H04W 12/06* (2013.01); *G07C 2009/00793* (2013.01); *H04W 84/18* (2013.01)

(56) References Cited

U.S. PATENT DOCUMENTS

| | | |
|---|---|---|
| 2006/0072755 A1 | 4/2006 | Oskari |
| 2006/0224901 A1 | 10/2006 | Lowe |
| 2009/0217718 A1 | 9/2009 | Porter |
| 2009/0295571 A1 | 12/2009 | Hosey |
| 2010/0075656 A1 | 3/2010 | Howarter et al. |
| 2010/0097239 A1 | 4/2010 | Campbell et al. |
| 2010/0283579 A1 | 11/2010 | Kraus et al. |
| 2011/0187505 A1 | 8/2011 | Faith et al. |
| 2011/0311052 A1 | 12/2011 | Myers et al. |
| 2012/0280783 A1* | 11/2012 | Gerhardt ............ G07C 9/00309 340/5.6 |
| 2013/0091561 A1 | 4/2013 | Bruso et al. |
| 2013/0127593 A1 | 5/2013 | Kuenzi et al. |
| 2013/0335193 A1 | 12/2013 | Hanson et al. |
| 2014/0005277 A1 | 1/2014 | Nakata et al. |
| 2014/0049370 A1 | 2/2014 | Eberwine et al. |
| 2014/0051407 A1 | 2/2014 | Ahearn et al. |

OTHER PUBLICATIONS

Written Opinion of the International Searching Authority for PCT/US2013/055456 dated Nov. 8, 2013, 5 pages.

European Search Report; European Patent Office; European Patent Application No. 13829338.6; dated Mar. 22, 2016; 10 pages.

\* cited by examiner

SYSTEM AND METHOD FOR USING AN ELECTRONIC LOCK WITH A SMARTPHONE

CROSS-REFERENCE TO RELATED APPLICATIONS

The present application is a continuation of U.S. patent application Ser. No. 13/968,678 filed on Aug. 16, 2013, which claims the benefit of U.S. Provisional Patent Application No. 61/684,070 filed on Aug. 16, 2012, the contents of each application incorporated herein by reference in their entirety.

BACKGROUND

The present invention generally relates to a communication system, and more particularly, but not exclusively, relates to an operation communication system.

SUMMARY

One embodiment of the present application is a unique communication system. Other embodiments include apparatuses, systems, devices, hardware, methods, and combinations for communicating. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

Figure 1:
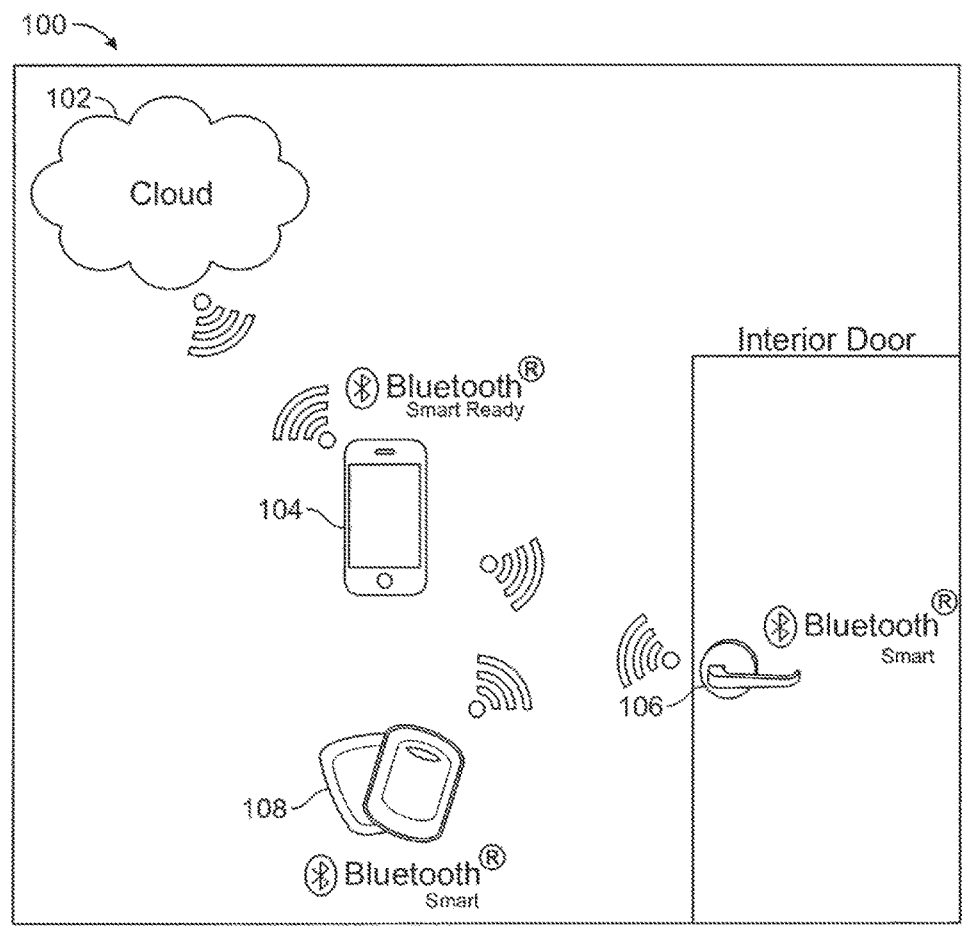
FIG. 1 is a schematic diagram of a system.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

FIG. 1 illustrates a system 100 including a cloud 102, a smartphone 104, and an electronic lock 106. The cloud 102 may provide certain services related to access control, credentials, and other information and/or functions related to the electronic lock 106 such as statuses, configurations, updates, key management, credential management, tracking, notifications, etc., as discussed below. In addition, the cloud 102 may include one or more servers and/or databases (not shown) that host and store the services and information.

The smartphone 104 may be any type of smartphone that can communicate with the electronic lock using a wireless communication protocol such as the wireless technology standard of Bluetooth as one example. The smartphone 104 also includes software and hardware such that the smartphone 104 can communicate with the cloud 102 such as over the Internet as one example.

The electronic lock 106 may be used, for example, to lock a door at a residential property or a commercial property. The electronic lock 106 includes software and hardware such that the lock 105 can communicate wirelessly with the smartphone 104 to exchange information and the like. A reader 108 may also be used in addition or in place of the electronic lock 106. The reader 108 includes software and hardware such that the reader 108 can communicate wirelessly with the smartphone 104 using the wireless technology standard of Bluetooth as one example.

The system 100 allows the electronic lock 106, the smartphone 104, and the cloud 102 to communicate with one another without the user of the smartphone 104 realizing that communication is occurring. This system 100 allows one or more operations to occur at the lock 106 and the smartphone 104. These operations may include: database updates being sent from the cloud 102 to the lock 106; door status updates, battery status, door audit information, etc. being sent from the lock 106 to the cloud 102; a lock configuration being sent from the cloud 102 to the lock 106; credentials being deleted or created (online or offline) via any node (e.g., smartphone 104) set up in the system 100; user tracking by the smartphone 104 sending lock ID information to the cloud 102 when a connection is made with the lock 106; key management algorithm—data security algorithm to be updated; lock maintenance information automatically sent from the lock 106 to the cloud 102; and the cloud 102 sending notifications to smartphones 104 such as, "Please close Door X" when it knows Door X is open and a smartphone 104 is in the vicinity of the door or a door database is out of date message to a system administrator.

The operations described above may implemented or accomplished with an application (not shown) on the smartphone 104. The application may run in the background of the smartphone 104. An application running in the background will allow the smartphone 104 to make a connection to both the cloud 102 and the lock 106 without the user realizing it. When a smartphone 104 makes a connection with a lock 106, the smartphone 104 may send the lock ID and phone ID to the cloud 102. The cloud 102 may reply back to the smartphone 104 with a grant/deny message and also send any updates to the lock 106 using the smartphone 104 as the communication pipeline.

In the present application, updates at the user database at the cloud 102 may occur dynamically through the smartphone 104. In one embodiment, the smartphone does not have to come in direct contact with the electronic lock 106 in order for the update from the smartphone to take place.

Figure 2:
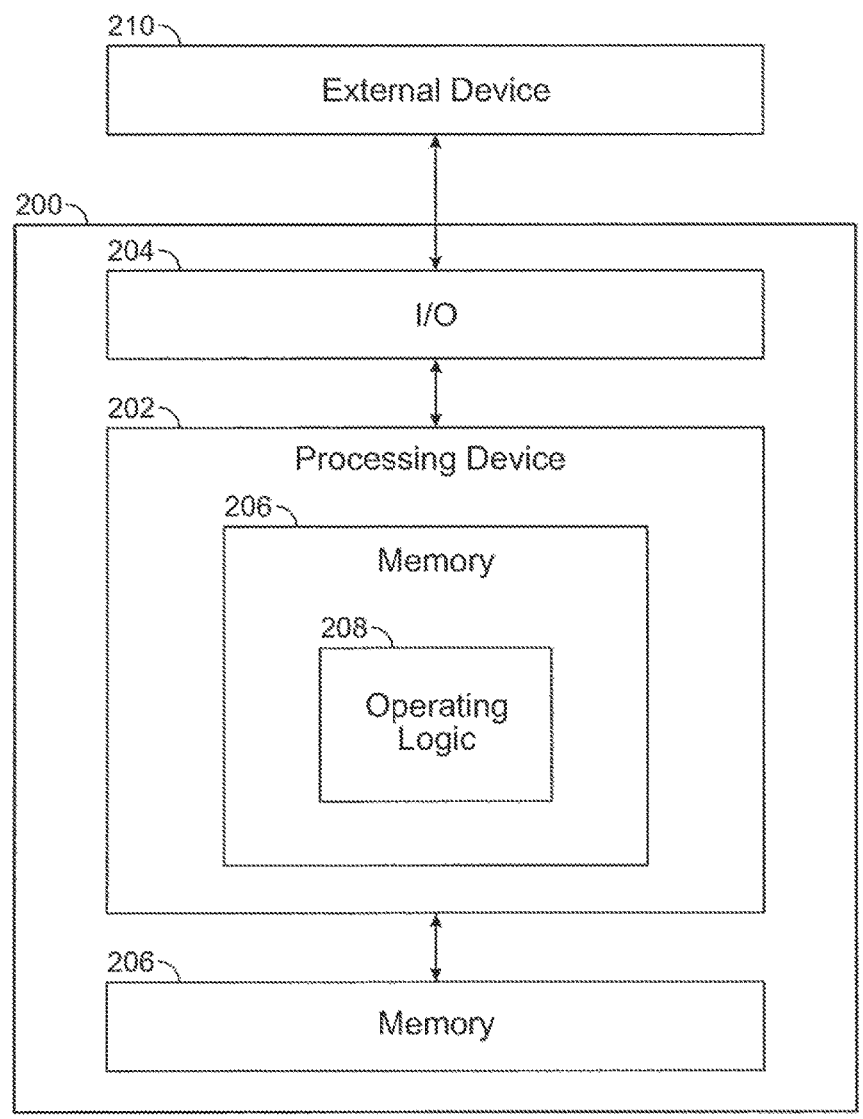
FIG. 2 is a schematic diagram of a computer.

FIG. 2 is a schematic diagram of a computer 200. Examples of the computer 200 include the server and/or database at the cloud 102, the smartphone 104, the electronic lock 106, and/or the reader 108 shown in FIG. 1. Computer 200 includes a processing device 202, an input/output device 204, memory 206, and operating logic 208. Furthermore, computer 200 communicates with one or more external devices 210.

The input/output device 204 may be any type of device that allows the computer 200 to communicate with the external device 210. For example, the input/output device may be a network adapter, network card, or a port (e.g., a USB port, serial port, parallel port, VGA, DVI, HDMI, FireWire, CAT 5, or any other type of port). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computer 200. For example, the external device 210 may be a computer, a server, a database, the cloud 102, the smartphone 104, the electronic lock 106, the reader 108, a printer, a display, an alarm, an illuminated indicator, a keyboard, a mouse, mouse button, or a touch screen display. Furthermore, it is contemplated that the external device 210 may be integrated into the computer 200. For example, the computer 200 may be a smartphone, a laptop computer, or a tablet computer in which case the display would be an external device 210, but the display is integrated with the computer 200 as one unit, which consistent with the general design of smartphones, laptop computers, tablet computers, and the like. It is further contemplated that there may be more than one external device in communication with the computer 200.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
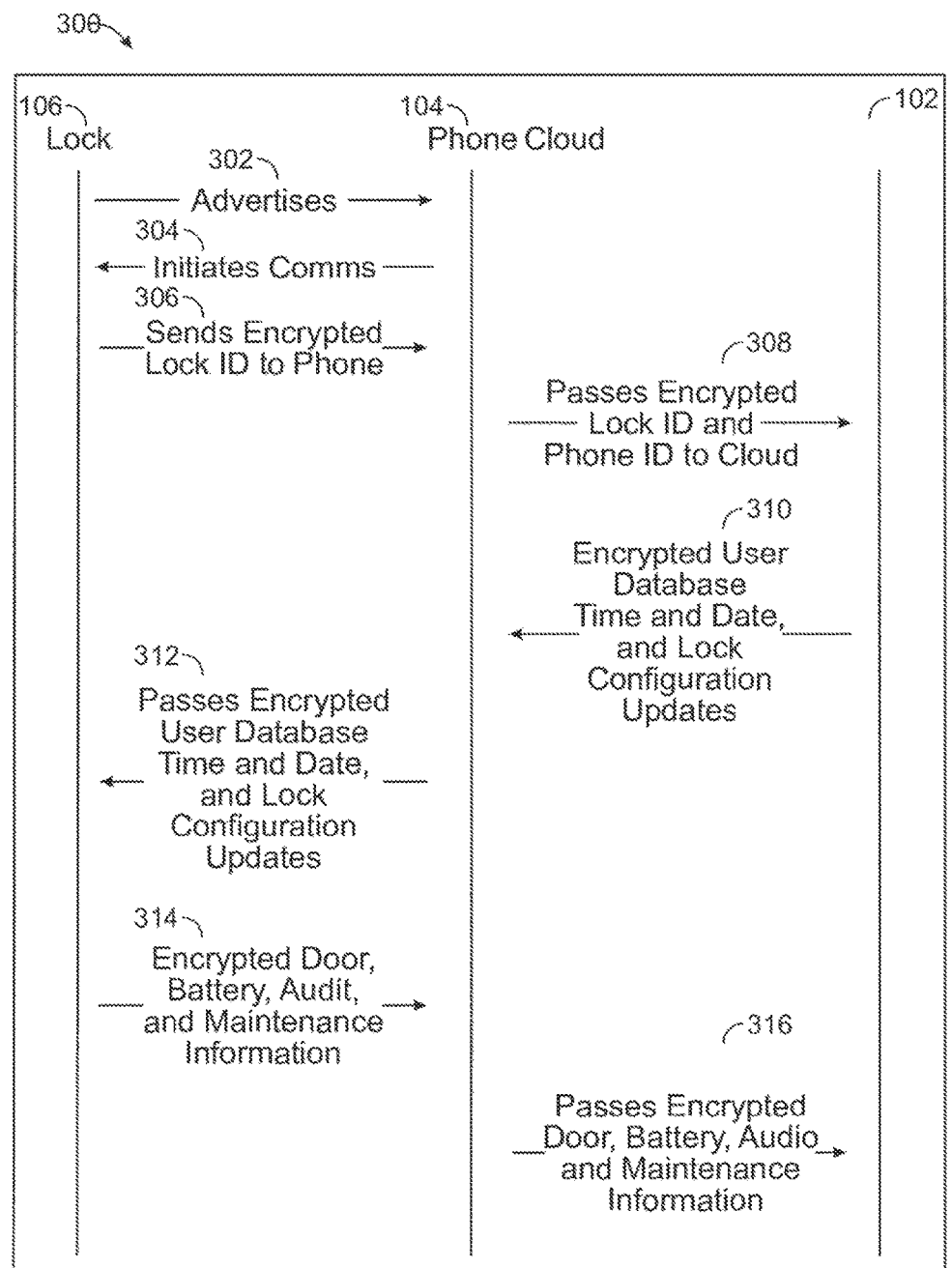
FIG. 3 is a communication diagram.

FIG. 3 is a communication diagram 300 illustrating one example of operations being carried out in the system 100. In message 302, the lock 106 advertises to one or more smartphones 104 that the lock 106 is available for communication or connection. The smartphone 104 responds to the lock 106 by sending message 304, which initiates or establishes communication. The lock 106 may then send a message 306 that includes an encrypted lock ID to the smartphone 104.

Next, the smartphone 104 sends a message 308 to the cloud 102 that includes the lock ID and the smartphone ID, which the cloud 102 may verify before sending any information back to the smartphone 104 and/or lock 106. The cloud 102 then sends message 310 to the smartphone 104, which includes updates that may be encrypted such as such as user database, time and date, and lock configuration updates.

The smartphone 104 sends message 312, which includes encrypted user database, time and date, and lock configuration updates, to the lock 106. Next, the lock 106 sends message 314, which includes encrypted door, battery, audit, and maintenance information, to the smartphone 104. The smartphone 104 may then send message 316, which includes the encrypted door, battery, audit, and maintenance information from the lock 106, to the cloud 102. The cloud 102 may then store the door, battery, audit, and maintenance information from the lock 106 in one or more databases for analysis or any other operation.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for controlling access of a door with a smartphone via wireless engagement, comprising:
    an electronic lock associated with the door and configured to:
    advertise to the smartphone that the electronic lock is available to be wirelessly engaged,
    automatically transmit to the smartphone a plurality of status updates after the electronic lock establishes wireless communication with the smartphone, wherein the plurality of status updates includes a current status of the electronic lock,
    automatically transmit to the smartphone a status update that the door associated with the electronic lock is in an open position when the door is in the open position, and/or a status update that the door associated with the electronic lock is in a closed position when the door is in the closed position; and
    a phone cloud associated with the electronic lock configured to:
    automatically wirelessly engage the electronic lock and the smartphone without a user of the smartphone realizing that wireless engagement between the smartphone and the electronic lock is occurring,
    receive an encrypted message from the smartphone that consists of a lock identification that identifies the electronic lock and a smartphone identification that identifies the smartphone,
    in response to receiving the encrypted message from the smartphone, transmit an encrypted message to the smartphone that consists of a user database update, a time and date update, and an electronic lock configuration update, determine whether a position of the smartphone is in a vicinity to a position of the electronic lock, determine whether the door associated with the electronic lock is in the open position when the door is in the open position based on the status update provided by the electronic lock and/or determine whether the door associated with the electronic lock is in the closed position when the door is in the closed position based on the status update provided by the electronic lock, and notify the smartphone that the door associated with the electronic lock is in the open position and request that the smartphone display to the user an instruction to close the door when the door is in the open position based on the status update provided by the electronic lock and the position of the smartphone is in the vicinity to the position of the electronic lock.

2. The system of claim 1, wherein the electronic lock is further configured to transmit a plurality of encrypted status updates to the smartphone after the identification of the electronic lock and the identification of the smartphone are verified by the phone cloud.

3. The system of claim 2, wherein the plurality of encrypted status updates include information associated with the door, information associated with a battery of the electronic lock, audit of the electronic lock, and maintenance information of the electronic lock.

4. The system of claim 3, wherein the phone cloud is further configured to store the information associated with the door, the battery information associated with the battery of the electronic lock, audit information of the electronic lock, and maintenance information of the electronic lock.

5. The system of claim 1, wherein the electronic lock and the smartphone wirelessly engage the wireless technology standard of Bluetooth communication.

6. A method for controlling access to a door with a smartphone via wireless engagement, comprising:

advertising, via an electronic lock associated with a door to control access through the door, to the smartphone that the electronic lock is available to be wirelessly engaged;

automatically transmitting, via the electronic lock, to the smartphone a plurality of status updates after the electronic lock establishes wireless communication with the smartphone, wherein the plurality of updates includes a current status of the electronic door;

automatically transmitting, via the electronic lock, to the smartphone a status update that the door associated with the electronic lock is an open position when the door is in the open position and/or automatically transmitting, via the electronic lock, to the smartphone a status update that the door associated with the electronic lock is in the closed position when the door is in the closed position;

automatically wirelessly engaging, via a phone cloud associated with the electronic lock, the electronic lock and the smartphone without a user of the smartphone realizing that wireless engagement between the smartphone and the electronic lock is occurring;

receiving an encrypted message from the smartphone that consists of a lock identification that identifies the electronic lock and a smartphone identification that identifies the smartphone;

in response to receiving the encrypted message from the smartphone, transmitting an encrypted message to the smartphone that consists of a user database update, a time and date update, and an electronic lock configuration update;

determining, via the phone cloud, whether a position of the smartphone is in a vicinity to a position of the electronic lock as received from the electronic lock;

determining, via the phone cloud, whether the door associated with the electronic lock is in the open position when the door is in the open position and/or whether the door associated with the electronic lock is in the closed position when the door is in the closed position based on the status update provided by the electronic lock;

notifying the smartphone, via the phone cloud, that the door associated with the electronic lock is in the open position and request that the smartphone display to the user an instruction to close the door when the door is in the open position based on the status update provided by the electronic lock and the position of the smartphone is in the vicinity to the position of the electronic lock.

7. A system for controlling access of a door with a smartphone via wireless engagement, comprising:

an electronic lock associated with the door configured to:
advertise to the smartphone that the electronic lock is available to be wirelessly engaged,
transmit an encrypted lock identification that identifies the electronic lock to the smartphone after the electronic lock establishes wireless communication with the smartphone,
adjust a lock configuration of the electronic lock,
transition between a locked state and an unlocked state as requested by the smartphone based on the lock configuration as adjusted by the electronic lock,
automatically transmit to the smartphone a plurality of status updates after the electronic lock establishes wireless communication with the smartphone, wherein the plurality of status updates includes a current status of the electronic lock, and a phone cloud associated with the electronic lock configured to:
automatically wirelessly engage the electronic lock and the smartphone without a user of the smartphone realizing that wireless engagement between the smartphone and the electronic lock is occurring,
receive an encrypted message from the smartphone that consists of the lock identification and a smartphone identification that identifies the smartphone,
in response to receiving the encrypted message from the smartphone, transmit an encrypted message to the smartphone that consists of a user database update a time and date update, and an electronic lock configuration update,
generate a lock configuration for the electronic lock to adjust into after the encrypted lock identification of the electronic lock is transmitted to the smartphone when the electronic lock is wirelessly engaged with the smartphone without the user of the smartphone realizing wireless engagement between the smartphone and the electronic lock is occurring, and
enable the electronic lock to be transitioned between the locked state and the unlocked state as requested by the smartphone based on the generated lock configuration for the electronic lock.

8. The system of claim 7, wherein the electronic lock is further configured to automatically transmit to the smartphone a status update that the door associated with the electronic lock is an open position when the door is in the open position and/or to automatically transmit to the smartphone a status update that the door associated with the electronic lock is in a closed position when the door is in the closed position.

9. The system of claim 8, wherein the phone cloud is further configured to determine a position of the smartphone relative to a position of the electronic lock as received from the electronic lock.

10. The system of claim 9, wherein the phone cloud is further configured to determine whether the door associated with the electronic lock is in the open position when the door is in the open position and/or to determine whether the door associated with the electronic lock is in the closed position when the door is in the closed position based on the status update provided by the electronic lock.

11. The system of claim 10, wherein the phone cloud is further configured to notify the smartphone that the door associated with the electronic lock is in the open position and request that the smartphone display to the user an instruction to close the door when the door is in the open position based on the status update provided by the electronic lock and the position of the smartphone relative to the position of the electronic lock.

12. The method of claim 11, further comprising:
transmitting a plurality of encrypted status updates to the smartphone after the identification of the electronic lock and the identification of the smartphone are verified by the phone cloud.

13. The method of claim 12, wherein the plurality of encrypted status updates included information associated with the door, battery information associated with a battery of the electronic lock, audit information of the electronic lock, and maintenance information of the electronic lock.

14. The method of claim 13, further comprising:
storing, via the phone cloud, the information associated with the door, the battery information associated with the battery of the electronic lock, the audit information of the electronic lock, and the maintenance information of the electronic lock.

* * * * *